United States Patent [19]
Arnold et al.

[11] 3,973,601
[45] Aug. 10, 1976

[54] APPARATUS AND METHOD FOR USE IN DEVELOPING WOUND COILS

[75] Inventors: Richard B. Arnold; Larry W. Straley, both of Fort Wayne, Ind.

[73] Assignee: General Electric Company, Fort Wayne, Ind.

[22] Filed: Mar. 5, 1975

[21] Appl. No.: 555,369

[52] U.S. Cl. .............................. 140/92.1; 29/205 D
[51] Int. Cl.$^2$ ........................................... B21F 3/00
[58] Field of Search..................... 140/1, 92.1, 92.2; 29/205 D

[56] References Cited
UNITED STATES PATENTS

| | | | |
|---|---|---|---|
| 3,036,603 | 5/1962 | Moore .............................. | 140/92.1 |
| 3,510,939 | 5/1970 | Smith ............................... | 140/92.1 |
| 3,575,219 | 4/1971 | Eminger .......................... | 140/92.1 |
| 3,579,791 | 5/1971 | Arnold ............................ | 140/92.1 |
| 3,851,682 | 12/1974 | Vogel et al. ..................... | 140/92.1 |
| 3,872,897 | 3/1975 | Droll et al. ..................... | 140/92.1 |
| 3,881,526 | 5/1975 | Bell et al. ........................ | 140/92.2 |

*Primary Examiner*—Lowell A. Larson
*Attorney, Agent, or Firm*—Ralph E. Krisher, Jr.

[57] ABSTRACT

Monitor position of winding flyer in relation to a machine frame, substantially continuously generate signals indicative of flyer position, and control relative jump of coil forms and flyer in response to signals. Jump is initiated during predetermined portion of a flyer revolution while flyer is in "jump window" relative to turn receiver. Energy stored in lost motion mechanism contributes to acceleration of jump mechanism; and same mechanism absorbs and stores energy as moving structure stops. Parts of coil forms are adjusted substantially equal distances relative to a geometric center and turn receiver and winding head undergo relative movement to maintain mutually aligned relationships. Fast and consistently responsive latch mechanisms insure jump during fraction of flyer revolution in different machine cycles. Jump mechanism urged against latches by pre-loaded spring mechanism for increased acceleration and to absorb prime mover force at end of jump stroke. Fast response diaphragm piston operated latch mechanisms perit initiation of jump stroke.

Means adjust coil form parts in opposite directions while form parts remain centered relative to flyer axis. Device maintains desired alignment of at least one coil form part and winding turn receiver. Screw with spaced apart right-hand and left-hand threads move coil form parts relative to one another.

17 Claims, 10 Drawing Figures

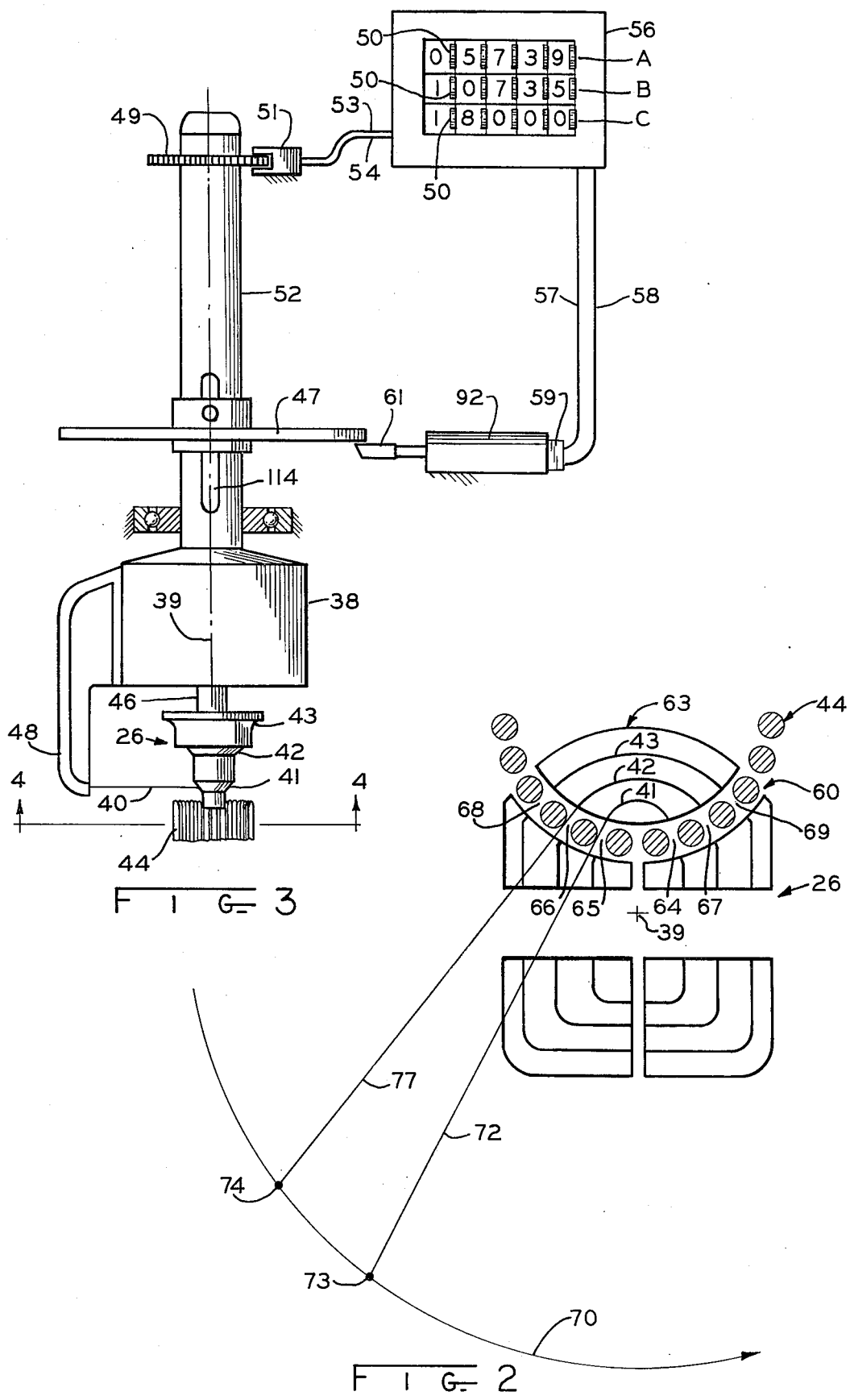

APPARATUS AND METHOD FOR USE IN DEVELOPING WOUND COILS

BACKGROUND OF THE INVENTION

The present invention relates to apparatus and methods for use in developing wound coils and, more particularly, to apparatus and methods that are useful for developing coils which are to be placed on magnetic cores of dynamoelectric machines, e.g., electric motors.

A number of different patents concerning winding machines and methods have now been published, and different types of equipment have been built that more or less correspond to many of such patents. Two United States patents which relate to winding techniques are Pavesi U.S. Pat. No. 3,557,432 which issued Jan. 26, 1971, and Hill et al. U.S. Pat. No. 3,625,261 which issued Dec. 7, 1971.

It is desirable, when using equipment of the type shown in the Hill, Pavesi, or other patents to have the capability of making adjustments so that coil turns of different developed turn lengths may be wound in order to provide windings for stator cores of different stack heights or axial lengths.

Equipment which has been developed heretofore can provide coils for cores having stack heights within a limited range. However, existing techniques and equipment are limited in the range of such adjustments; and this is due at least in part to eccentric geometrical relationships (vis-a-vis coil form assemblies, turn receiving mechanisms, and wire dispensing means) which are either established or aggravated when such adjustments exceed a relatively limited range. For example, as the length of side turn portions of a winding is increased (to correspond to larger core stacks), an eccentric relationship between a coil form assembly and wire dispenser increases, and, as a result thereof, it is necessary to reduce winding speeds. In many cases, the just referred to eccentricity has been thought to be unavoidable because of the requirement that a predetermined part of a coil form assembly be maintained in alignment with a winding turn receiver. Thus, it would be desirable to provide a method and apparatus by which coil forms may be adjusted to a maximum extent while maintaining a concentric relationship between wire dispensing or depositing means and the coil forms; and yet also maintain a predetermined alignment between at least one of the coil forms and a winding turn receiving mechanism that forms part of a winding apparatus.

Winding techniques that have now become known as the "wind and shed" or "shedder winder" approach are taught, for example, in Smith, U.S. Pat. No. 3,510,939 which issued May 12, 1970; Arnold, U.S. Pat. No. 3,579,818 which issued May 25, 1971; Cutler et al, U.S. Pat. No. 3,522,650 which issued Aug. 4, 1970; Smith et al U.S. Pat. No. 3,742,596, which issued July 3, 1973; and Arnold, U.S. Pat. No. 3,579,791 which issued May 25, 1971; each of which is assigned to the assignee of the present invention. The apparatus and methods disclosed in the just referenced patents also may be improved with new and improved approaches whereby geometrical concentricity is maintained between winding forms and wire dispensing means while at least one winding form part is maintained in alignment with a turn receiver; even when form parts are spread apart a maximum possible distance within a flyer arm path.

In shedder or wind and shed type equipment, it is particularly important that aligned relationships be maintained between a turn receiving device and a coil form part because of the "interfitting" or relatively telescoping mutually co-operating relationships that, preferably, are maintained between such device and one or more coil form parts.

Various ones of the equipment illustrated in the above referenced commonly assigned patents include one or more winding turn receiving mechanisms that establish or define turn receiving gaps or slots; and winding turns for a given coil are moved along two predetermined ones of such gaps while each coil is being developed. Each set of those predetermined gaps correspond with two predetermined slots of a stator core, and when an intercoil wire segment is inadvertently placed in the wrong gap, such misplaced wire segment will almost inevitably be broken when it ultimately is axially inserted into the stator core. Misplaced intercoil wire segments have become an increasing problem, particularly as winding speeds have been increased. In an effort to solve this problem, we have now determined that it is desirable to increase the accuracy of the operational interrelationships of various parts, and to improve such parts themselves, as well as winding methods, so that a winding receiving mechanism and a coil forming mechanism may be axially moved relative to one another in a particular manner and at a particular time so as to overcome the misplaced intercoil wire segment problem.

It is, accordingly, an object of the present invention to provide new and improved methods and apparatus for developing winding coils whereby different parts of a given turn developing means are rapidly and accurately moved relative to one another while they are in a predetermined geometrical relationship, one relative to another, and while at least one of such parts is moved relative to the other.

It is a more particular object of the present invention to provide new and improved methods and apparatus that provide for the correct positioning of a cross-over wire (e.g., an intercoil wire segment) in a coil group when the coils are being developed in a winding receiver, so as to eliminate subsequent wire breakage or short turns within one or more of the coils.

It is a more specific object of the present invention to provide improved winding methods and apparatus that accomplish rapid acceleration of parts of a winding head and yet are conducive to reduce deceleration of such parts during one or more machine cycles or sub-cycles.

It is a more particular object of the present invention to provide new and improved winding methods and apparatus to cause the release of stored energy from a lost motion mechanism at the beginning of a coil form jump cycle, and the storage of energy by such mechanism at the end of such cycle.

It is yet another object of the present invention to provide a new and improved latch mechanism which determines the relative position of at least two parts in a winding machine mechanism.

Still another object of the present invention is to provide apparatus and methods for adjusting parts of winding apparatus whereby the distance between coil form parts may be increased while a geometrically centered relationship is maintained between winding turn dispensing means and the coil form parts, and yet while a predetermined alignment between a winding turn receiver and at least one coil form part is also maintained.

SUMMARY OF THE INVENTION

While carrying out various ones of the above objects of our invention, in one form thereof, we have provided methods and apparatus for monitoring the position of a rotating winding member in relation to a machine frame, with a high degree of accuracy and substantially continuously; and generating signals that are indicative of substantially the exact position of the winding flyer, and then controlling the relative movement of two different mechanisms (e.g., coils forms and a flyer) in response to such signals. In the more preferred forms, such movement is initiated only during a predetermined portion of a flyer revolution; and such movement is effective only while a wire segment is located in a desired jump window relative to a turn receiver. Also provided are methods and apparatus that utilize energy stored in a mechanism to contribute to the acceleration of a movable jump mechanism, and that absorb and store energy as the jump mechanism comes to rest, thereby to permit more rapid deceleration of the jump mechanism.

In accordance with another aspect of the present invention, we have provided a method whereby parts of coil forms are adjusted, substantially equal distances relative to a predetermined geometric center, and whereby winding turn receiving means and a winding head carrying the coil forms undergo relative movement so that the turn receiving means and at least one coil form part may be maintained in a desired mutually aligned relationship.

One preferred illustrated form of apparatus includes not only new and improved jump mechanisms, but also new and improved fast and consistently responsive latch mechanisms which insure that an axial advance or jump may be consistently accomplished during a corresponding fraction of a revolution in different machine cycles, even though a flyer may be revolving at speeds as high as 3,000 revolutions per minute. In one specific form illustrated herein, a jump mechanism is urged against stops or latches by a pre-loaded spring mechanism which contributes to increased acceleration at the beginning of a jump stroke, and yet absorbs the force applied by a prime mover at the end of a jump stroke, so as to again pre-load the spring mechanism and reduce the level of impact forces to which the jump mechanism and one or more latch members are subjected. Another specific exemplified structure includes fast response diaphragm piston operated latch mechanisms which are utilized when initiating the jump stroke of a jump mechanism.

Exemplified apparatus which embodies other aspects of the invention includes a means for adjusting coil form parts in opposite directions relative to one another while the coil form parts remain centered relative to a pretermined axis. Also included are means for maintaining a desired alignment of at least one coil form part and winding turn receiving means. In one more preferred form, we utilize a screw with spaced apart right-hand and left-hand threads to move the coil form parts relative to one another.

The subject matter which we regard as our invention particularly pointed out and distinctly claimed in the concluding portion of the specification. Our invention itself, however, both as to its organization and method of operation; together with further objects and advantages thereof, may best be understood by reference to the following description taken in connection with the accompanying drawings.

BRIEF DESCRIPTION OF THE DRAWINGS

FIG. 2 is a schematic showing of parts of winding forms, parts of a turn receiving mechanism, the path of travel of a rotating flyer arm, and somewhat idealized jump window extremities to illustrate some aspects and features of the present invention;

FIG. 3 is a schematic representation of a mechanism that may be utilized to monitor the location of a flyer arm and initiate release of a jump mechanism when practicing the invention in one form thereof;

DESCRIPTION OF THE PREFERRED EMBODIMENTS

Figure 1:
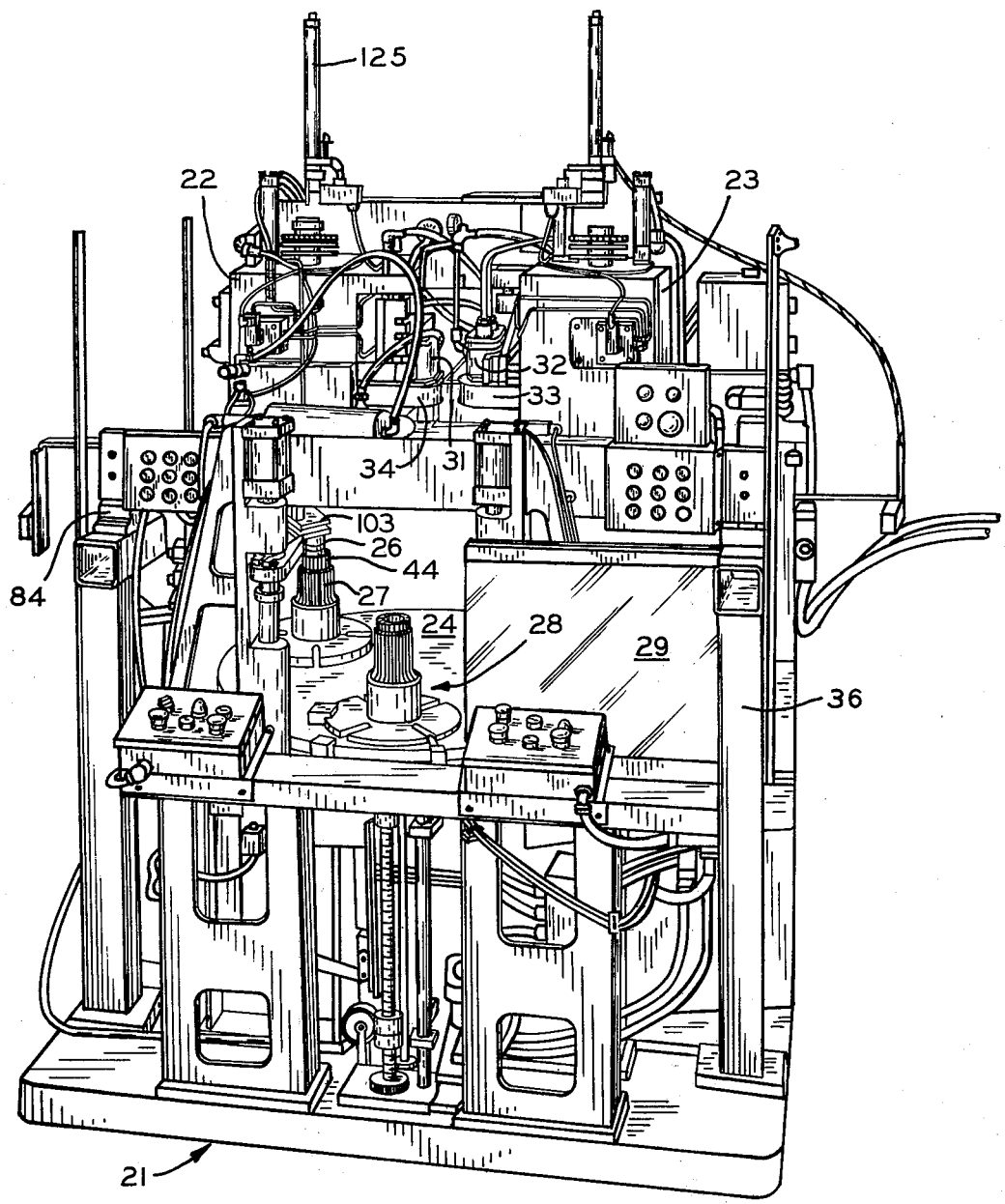
FIG. 1 is a perspective view of winding apparatus that may be utilized to carry out various aspects of our invention in one form thereof, and which includes new and improved winding heads and other mechanisms that embody our invention in another form thereof.

In FIG. 1, a coil winding machine 21 is shown which is particularly adapted to carry out our invention in one preferred form thereof. A number of parts have been omitted from the structure of FIG. 1 in order to simplify illustration. For example, wire clamps and interpole lead pullers have been omitted. However, such parts are shown in detail in an application filed on the same day as this application, in the name of Richard B. Arnold, titled Winding Machine Apparatus and Methods (Ser. No. 555,370, and assigned to the assignee of the present application. The entire disclosure of this Arnold application is incorporated herein by reference.

The machine 21 includes first and second substantially identical winding heads 22, 23. During operation of apparatus 21, winding turns for coils of a first phase winding are generated by winding head 23 and received by a winding turn receiver (hidden from view in FIG. 1) which is supported on turntable 24. At substantially the same time, winding turns for a second phase winding are developed by winding head 22 about coil forms 26 and shed into winding turn means that is illustrated as a coil injection mechanism 27 which usually will be carrying a first phase winding therein when it arrives (on turntable 24) under winding head 22. It will be understood therefore that each turn receiving mechanism receives winding turns from each winding head 23, 22, and then is moved to an injection station 28 where: a stator core is positioned over the upper end of such mechanism; clamp arms 31 (one of which is hidden from view in FIG. 1) are moved into clamping engagement over the core; and windings stored in the winding turn receiving mechanism are axially injected into the clamped stator core. Thereafter, the stator core is removed from a winding turn receiving mechanism, and turntable 24 indexes 120 mechanical degrees so that the turn receiving mechanism which previously was located at inject station 28 is positioned at a winding turn receiving station under head 23, which is hidden from view in FIG. 1 by a guard plate 29. While winding turns are being developed by winding head 23, other winding turns (preferably) are being developed by winding head 22 so machine cycle times may be minimized.

Preferably, the winding heads 22 and 23 are modular units which may be relatively quickly mounted on, or demounted from, the frame of the apparatus 21. To this end, the winding heads 22 and 23 are substantially completely self-contained and each includes a fluid motor 31, 32, that each respectively supplies power to a winding head, e.g., by means of belts 33, 34. Each of the winding heads 22, 23 is supported by a pair of horizontally extending, parallel support bars which form part of the frame 36 and which are hidden from view in FIG. 1. Each winding head is clamped to its respective pair of support bars by caps or set screws, and the winding heads 22, 23 may be adjusted on their supports. Alternatively, heads 22, 23 may be automatically or semi-automatically repositioned along their supports in order to provide advantages that are discussed in more detail hereinafter in conjunction with FIGS. 8 through 10.

The turntable 24, controls, and coil injection mechanism of the apparatus 21 may be substantially similar to the apparatus described in the aforementioned Hill et al, U.S. Pat. No. 3,625,261 or the Pavesi patent. Accordingly, the dislosures of said Hill et al and Pavesi patents are incorporated herein for background purposes.

Figure 4:
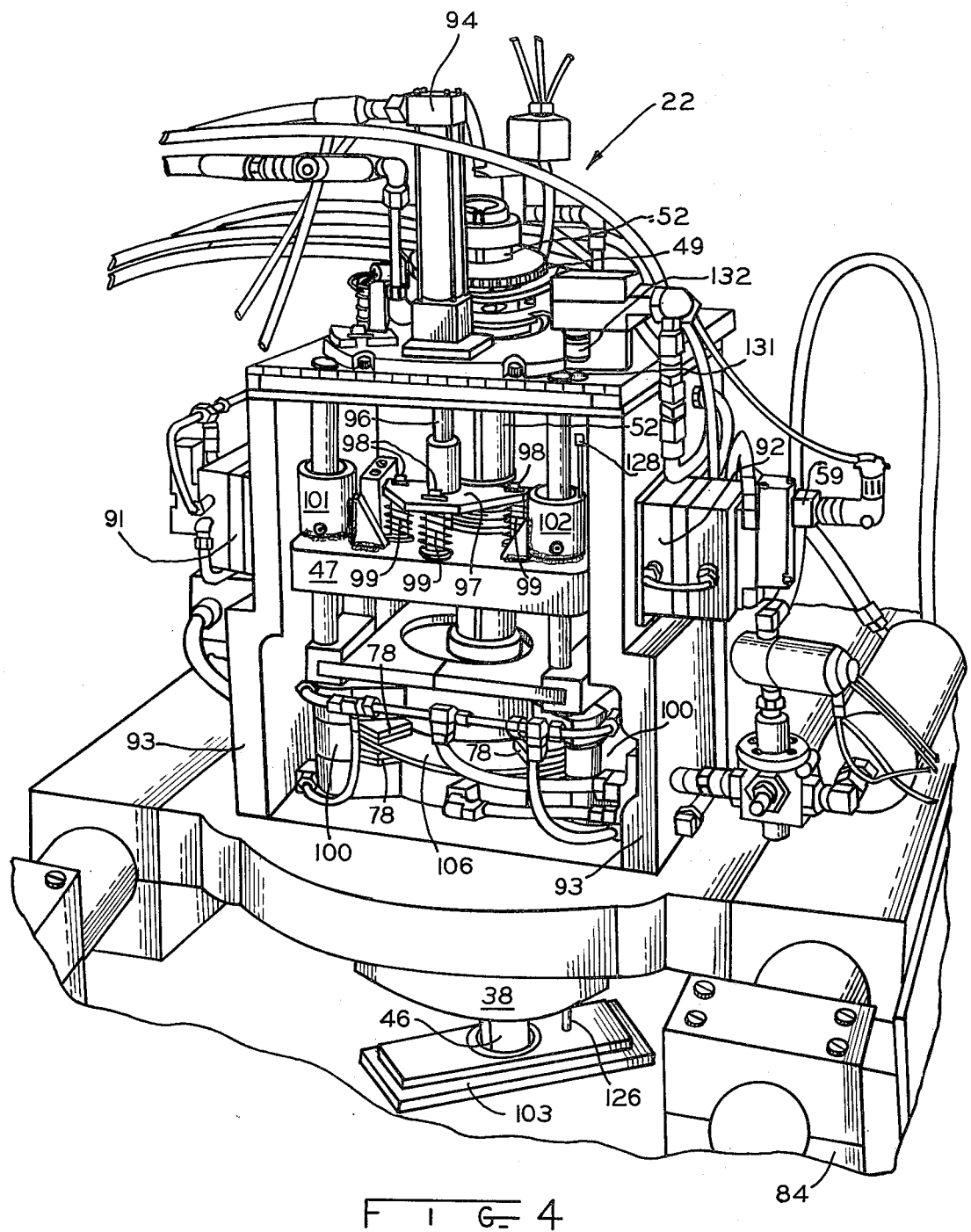
FIG. 4 is a perspective view of an improved winding head that is part of the apparatus shown in FIG. 1.

An enlarged perspective view of winding head 22 is shown in FIG. 4, but reference is first made to the schematic representations of FIGS. 2 and 3 for some of the principles of operation associated with parts of the winding head 22.

With initial reference to FIG. 3, it will be appreciated that a flyer 38 revolves about a central axis 39 and develops turns of wire 40 about the coil form 26. The coil form 26 illustrated in FIG. 3 includes three winding stages 41, 42, and 43, each of which is successively larger than a preceding stage. As turns are developed about each stage (stage 41, for example), initially formed turns are moved forwardly from the free end of the form, and along gaps between predetermined ones of the tooling members 44. After a predetermined number of turns have been formed about the stage 41, the coil form 26 is "jumped", i.e., moved axially or longitudinally along axis 39 so that a next larger stage 42 is disposed in a position to have winding turns developed thereabout by the flyer 38. The jump action takes place while the flyer 38 continues to rotate at a high speed. After a predetermined number of turns has been generated about winding stage 42, coil form 26 is again jumped so that winding stage 43 is disposed in the winding plane, and turns are generated thereabout by the flyer 38. It will be understood that a jump force is applied to jump plate 47 and that coil form 26 is connected to jump plate 47. The manner by which movement of jump plate is initiated will be discussed in more detail in conjunction with FIG. 4, but it is now further noted that jump cylinder 46 interconnects form assembly 26 end jump plate 47.

With continued reference to FIG. 3, it is noted that the rotational position of the flyer arm 48 is substantially continuously monitored by means of a position indicator which has been illustrated as a disc 49 and magnetic sensor 51. The disc 49 is provided with 50 equally spaced teeth and may be, for example, a 50 tooth gear. Preferably the teeth faces and spaces therebetween have equal arcuate extents. The sensor 51 is supported by the machine frame and emits a pulse as each leading and trailing edge of each tooth moves therepast. Since the teeth are spaced uniformly around the periphery of the disc 49, and the notches or spaces between the teeth have arcuate extents the same as the teeth, sensor 51 provides 100 pulses during each revolution of cylinder or spindle 52; each successive pulse will indicate that the flyer arm has moved 1-one hundreth of a revolution, or 3.6°. In one reduction to practice, sensor 51 was purchased from I.S.C. Magnetics Corporation of Huntington Park, N. Y. and identified as a magnetic pick-up, Catalog No. B-12L-5S.

The pulses from sensor 51 are applied, by way of circuit means 53, 54 to a counter 56. In one preferred form, the counter 56 was a five decade electronic counter which was purchased from the Dynapar Corporation of Gurney, Illinois, and identified as a 12 preset model 5Z5CSP, assembly number 3-296088. The counter 56 may be programmed to indicate the number of turns that may be desired for each coil of each coil group, (or pole), and for different numbers of poles. Programming may be accomplished by turning thumbwheel switches so that the desired cumulative turn count before each jump point is indicated by counters on the control device. Three rows of counter settings and thumbwheel switches 50 have been shown in FIG. 3, but it will be understood that the purchased control has greater capacity than indicated by FIG. 3.

When flyer 38 first starts winding a coil group, a pulse is generated by sensor 51 for each one-hundreth of a revolution. As soon as a number of pulses have been supplied to counter 56 that equal the number preset in counter row A, a voltage is applied to circuit means 57, 58, and such voltage constitutes a jump signal. Then, when the cumulative number of pulses equal the preset count indicated in row B of counter 56, a second jump signal is applied to a counter output circuit. For a three coil pole (or coil group), the number preset in counter row C will indicate the total number of desired pulses for a completed coil group.

A jump signal transmitted by circuit means 57, 58 is applied to an air valve, e.g., air valve 59 which initiates retraction of an appropriate latch bar 61, and permits jump plate 47 to advance the coil form so that a next subsequent winding stage is positioned in the winding plane. Jump plate 47 is permitted to advance only a sufficient amount to move a next successive winding stage into the winding plane, and the means by which this limited advance of the jump plate is accomplished is described in more detail in conjunction with FIGS. 4–7 hereinbelow. It is noted that control 56 has a number of different output terminals and that each terminal corresponds to a different preset counter row, so each signal may be applied to a different valve solenoid.

In FIG. 4, parts have been omitted in order to simply illustration. However, it will be noted that coil form assembly 26 is made of a plurality of parts, at least two of which may be adjusted one relative to another as described, for example, in the commonly assigned and now co-pending Lauer and Pieper application Ser. No. 539,135 which was filed Jan. 7, 1975 as a continuation of an application filed on Mar. 18, 1974 as Ser. No. 452,419 now abandoned.

The front coil form portion or part 63 is separated from the remainder of the coil form assembly by a gap 60 along which pins or fingers 42 are telescopically received during a winding operation. As turns of wire are generated about the coil form stage 41, other turns previously generated thereabout move along the gaps 64, 65 between two adjacent fingers or pins 44. Then, after a coil form jump, turns of a larger size that are generated about stage 42 are moved along gaps 68, 69. Malfunction of the winding apparatus, broken cross-over wires (inter-coil leads), or "short turns" may result if the last winding turn portion to be generated about one winding stage is inadvertently placed in the wrong gap between pins 44. This may be avoided, however, by precisely and accurately controlling each jump of the coil form so that a jump occurs only during a predetermined portion (or "window") of a flyer revolution. However, the optimum "window" for a jump is different for each coil. For example, assuming that arrow line 72 represents the path of the flyer arm during a counter clockwise revolution, an optimum jump window or period might commence at the time that the flyer arm is at point 73, when turns are being generated about coil form stage 41. At this time, a wire segment 72 will extend from the flyer arm to stage 41, and the coil form assembly may be jumped without substantial danger of the wire segment 72 being moved into a gap other than gap 65. The next jump, however, should be made not earlier than point 74, after wire segment 77 is positioned for movement into gap 66. The beginning of optimum jump windows thus differs from each differently sized coil, and also differs for coils of the same size but which are being developed during opposite directions of flyer rotation. The optimum "window" that exists for each individual jump extends for a fraction of a revolution and the end of such window has not been shown in FIG. 4. It will be understood, however, that the windows which start at points 73 and 74 are closed prior to the time that a jump would cause placement of segments 72, 77 in gaps 67, 69, etc.

With reference now to FIG. 4, it will be understood that winding heads, such as winding head 22, involve a number of relatively massive parts, and that the various mechanical motions that are required by a manufacturing operation each involve some discrete amount of time. For example, some mechanical time lag is involved from the time that a signal is supplied to valve 59 until the time that latch pin 61 is retracted. Moreover, some amount of time is required for acceleration of jump plate 47 and the coil form assembly. However, we have determined that for a given winding head, the mechanical time lag required remains relatively constant. In addition, for a given flyer speed and given wire size the jump window is a constant (for practical purposes) for each jump. For example, when flyer 38 is rotating at approximately 3,000 rpm, flyer arm 38 will travel through approximately two revolutions from the instant that a jump command is signaled by counter 56 until the instant that the coil form assembly has in fact been jumped to a successive axial position thereof. Accordingly, when construction of a winding head such as winding head 22 has been completed, it is preferable to set the winding head, with coil forms mounted thereon, on a test bench and position a winding receiver to receive turns from the coil form. Any desired number of winding turns for first, second, and third coils (or more, if desired) are then arbitrarily selected and the thumb-wheel switches in rows A, B, C, etc. of counter 56 are preset so that the winding heads will generate the desired number of turns for a coil group. The winding head 22 is then actuated and its operation observed. At this time, it may be necessary to modify the settings of the thumb-wheel switches on the counter 56 until precisely the desired number of turns for each coil are developed and so that the cross-over wires are disposed in the desired gaps. In this fashion, it is possible to establish calibration data that correlates with the electronic and mechanical portions of each winding head.

For example, on one winding machine head, initial calibration may involve the arbitrary selection of a three coilgroup wherein the inner coil is to have 50 turns, the second coil 60 turns, and the outer or larger coil is to have 70 turns of wire, respectively. Since the counter 56 (see FIG. 3) registers a cumulative number of turns per pole: counter row A would initially be set to read 05000 so that a first jump would occur after 50 turns had been developed. Counter row B would be set to read 11,000 so that a second jump would be signaled after 110 total turns, and counter row C would be set to 18,000 so that the flyer would stop after 180 complete turns had been developed. After winding such a pole at a flyer speed of 3000 rpm and counting the turns in each coil, it will usually be found that the inner coil will have one or two excess turns, and the outermost coil will be short a similar number of turns. Moreover, the cross-over wire segment will have been placed in a gap due to a random jump. Thus, for a second trial, rather than setting the counter 56 so that a jump command issues at 50.00 turns and again at 110.00 turns, followed by a stop command at 180.00 turns; the counter would be reset so that the first jump command would occur at 48 turns, and the second jump command at 108 turns. However, the switches in row C of the counter would remain set at the total turn count, since winding head 22 (like most commercially available winding heads) decelerates during the last few turns in each pole and may be stopped with essentially no time lag.

As previously mentioned, a jump signal may be provided within one one-hundreth of a revolution so that the cross-over wires will always be positioned in a desired tooling gap. The two right-hand most wheels in each of rows A, B, C, etc. (see FIG. 3) identify the fraction of a revolution, to the nearest hundreth, at which a jump signal is desired. Thus, while a winding head is still on a test bench, it may be calibrated so that a coil form jump will take place only while the flyer arm is in the proper window, for each coil stage, so that proper placement of each cross-over wire will be assured. Once the winding head 22 has been calibrated in the manner just explained, the calibration data may be recorded for various combinations of wire sizes, spindle speeds, and coil turn counts; and then by referring to such data the winding head may be quickly set up in the field to develop would coil groups of any desired number of coils, each having any desired number of turns, at any desired speed, and with any desired wire size. Then, once the head has been set up (by setting counter rows A, B, C, etc.), coil groups will consistently be produced.

We have determined that the calibrations above referred to, once made, remain substantially constant. However, it is known that the flyer accelerates to a maximum speed and then decelerates to a rest position during the development of each pole; and the actual flyer speed at a jump point depends on how many turns have been developed prior to the jump. Thus, it also is preferable to provide a tachometer which may be used to confirm actual spindle speeds. When so provided, a tachometer may, for example, derive its signal from disc 49 or from sensor 51. The preferred construction that has now been described also is useful in the event various machine parts become worn. For example, if brake pads or pucks 78 become glazed or worn, flyer 38 may stop a few degrees past a desired stopping point. This may be quickly corrected by setting counter row C of counter 56 so that a stop command would be given at, for example, a reading of 17,797 (177.97 turns) rather than at a reading of 18,000 (180.00 turns). Although it should now be understood, it is specifically noted that a counter row reading of, for example, 00001 would indicate 0.01 revolution; and a reading of 78,410 indicates 784.10 revolutions, or turns of flyer 38.

With reference now to FIG. 4, structural details of winding head 22 will be described. First, it is noted that a portion of the machine frame 84 is shown in both FIGS. 1 and 4; and that the same reference numbers have been used for like parts in FIGS. 3 and 4. Thus, the drive shaft 52 as well as disc 49 and jump plate 47 are readily visible in FIG. 4.

The jump plate 47 is restrained from moving axially along the drive shaft 52 by means of latches that are controlled by cylinders 91 and 92, and these mechanisms are described in more detail hereinbelow in conjunction with FIGS. 5 and 7. During a winding operation, the winding tube or drive shaft 52 rotates relative to jump plate 47 and winding head frame 93. From the time that flyer 38 starts to rotate, and until it stops, air is supplied to air cylinder 94 which is interconnected through rod 96 to a drive plate 97. The drive plate 97 is connected through a lost motion mechanism with jump plate 47 and this mechanism includes three guide bolts 98 which are threaded into jump plate 47. The drive plate 97 is biased toward jump plate 47 and compresses springs disposed therebetween during the time that air cylinder 94 is supplied with air pressure. The springs 99 are disposed loosely about bolts 98. Then, as soon as the latch pins are retracted which normally restrain movement of jump plate 47, jump plate 47 moves downwardly (as viewed in FIG. 4) along guide rods 101, 102 because of the expanding coil springs 99 and because of movement of rod 96 under the influence of air cylinder 94. Jump plate 47 accelerates more rapidly when it is interconnected to a prime mover (such as cylinder 94) in the manner illustrated in FIG. 4. Thus, acceleration of jump plate 47 is not dependent solely on the acceleration of rod 96. Moreover, as jump plate 47 is arrested from further movement by a subsequent latch pin, piston rod 96 is permitted to decelerate somewhat more slowly as it overdrives drive plate 97, and recompresses the coil springs 99 against jump plate 47.

At the end of a winding cycle for one pole, when jump plate 47 is to be retracted to its uppermost position; rod 96 is retracted, and the action of drive plate 97 on the heads of bolts 98 raises jump plate 47 along guide rods 101, 102. After the jump plate 47 has been raised to its uppermost position, the valving for air cylinder 94 is reversed and piston rod 96 is once again urged downwardly to hold the coil springs 99 in compression against jump plate 47. Other parts of the winding head 22 are shown and described in various ones of the above-identified commonly assigned patents and reference may be made to these patents for various additional details. Accordingly, the above-referenced commonly assigned patents are incorporated herein by reference. It will be noted that the coil form support plate 103 has been shown in FIG. 4 but that, for ease of illustration, the coil form assembly has been omitted from FIG. 4. It will be understood that brake disc 106 is carried by the drive cylinder or winding tube 52, and brake pads 78 are urged thereagainst by calipers 100 when supplied with a stop signal from the Dynapar control.

Figure 6:
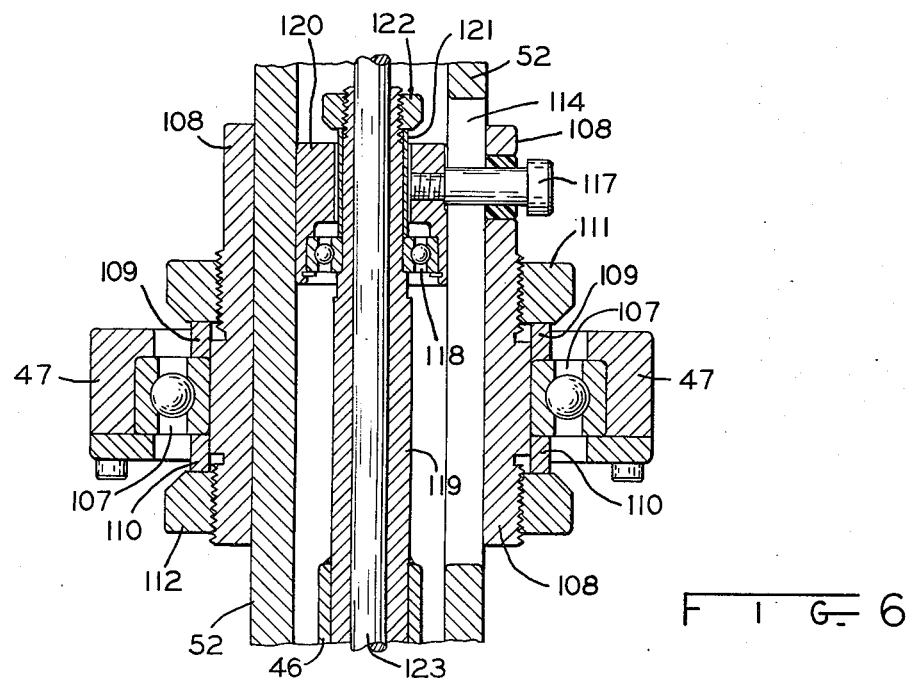
FIG. 6 is an enlarged sectional view of a portion of the structure shown in FIGS. 4 and 5.

Details of the interrelationships between jump plate 47, the jump tube 46, and the drive spindle 52 will be better understood by now considering FIG. 6 in conjunction with FIG. 4. It will be noted that the outer race of a bearing 107 is trapped in the jump plate 47, whereas the inner race of the bearing 107 is trapped by, and free to rotate with, a threaded bushing 108 which rotates with, but is free to slide along, spindle 52. It will be seen in FIG. 6 that the inner race of bearing 107 is trapped on bushing 108 by means of a pair of spacers 109, 110, which are urged against the inner race of the bearing by collars 111, 112 that are threaded onto the bushing 108. The bushing 108 thus is free to rotate with drive spindle 52 relative to jump plate 47. Since bushing 108 is received with a sliding fit on the cylinder 52, it is free to move axially therealong whenever the jump plate 47 is jumped axially. Thus jump plate 47 carries both the outer and inner races of the bearing 107 downwardly (in FIG. 6) during a jump stroke.

The cylinder 52 is provided with an axially extending slot 114 (see FIGS. 6 and 3) and a bolt 117 which is trapped in bushing 108 moves axially along slot 114 during a jump stroke.

Within the interior of drive spindle 52, another bushing 120 is constrained to rotate with the bolt 117, and yet bushing 120 (like bushing 108) is permitted by reason of a slide fit to slide axially along the cylinder 52 during a jump stroke. This inner bushing 120 traps the outer race of yet another bearing 118, and the inner race of bearing 118 is locked to a jump tube 119. It will be noted that a spacer and nut arrangement 121, 122 is utilized to lock the inner race of bearing 118 against a shoulder on the tube 119. Tube 119 is spaced from bushing 120 so that tube 119 may be constrained from rotation although bushing 120 rotates with cylinder 52. The tube 119 is interconnected with jump tube 46 by means of any convenient means such as a weld bead or set screws. Although it is not necessary for an understanding of the present invention, it is noted that the tubes 119 and 46 also serve as a guide for a stripper rod 123 which, at appropriate times, is actuated to strip any remaining winding turns from a coil form after a coil group (or pole) has been completely wound. Actuation of the stripper rod 123 is accomplished by supplying air to a long stroke cylinder (cylinder 125 which has been shown in FIG. 1 but which has been omitted from FIG.

in order to simplify illustration). As will be understood from previous discussion, the form assembly support plate 103 is supported by the jump tube 46; and jump tube 46 as well as support plate 103 are prevented from rotating by means of a stabilizing pin 126 which is securely fastened to plate 103 and slidably received in a pin receiving opening of a stationary portion of the winding head 22. The relationships of the flyer, winding head frame, and other portions of the winding head 22 that lie below the disc brake 106 are shown in complete detail in Arnold et al U.S. Pat. No. 3,732,897 (referred to hereinabove) and, accordingly, the entire disclosure of said Arnold et al Patent is incorporated herein by reference.

It will be understood that, as the coil form support plate 103 moves axially, pin 126 slides along a stationary surface of the winding head structure. At the end of a winding subcycle (that is after a coil group has been developed) the flyer drum 38 is stopped at a precise location as determined by the final turn count setting in the previously described control. The controls for the winding head 22 then cause the air cylinder 94 to retract the rod 96, and jump plate 47 is raised until a pin 128 (see FIG. 4) carried thereby passes through an opening 131 in the winding head frame and hits a limit switch 132, to signal that the winding forms have been moved to their fully retracted position.

Figure 5:
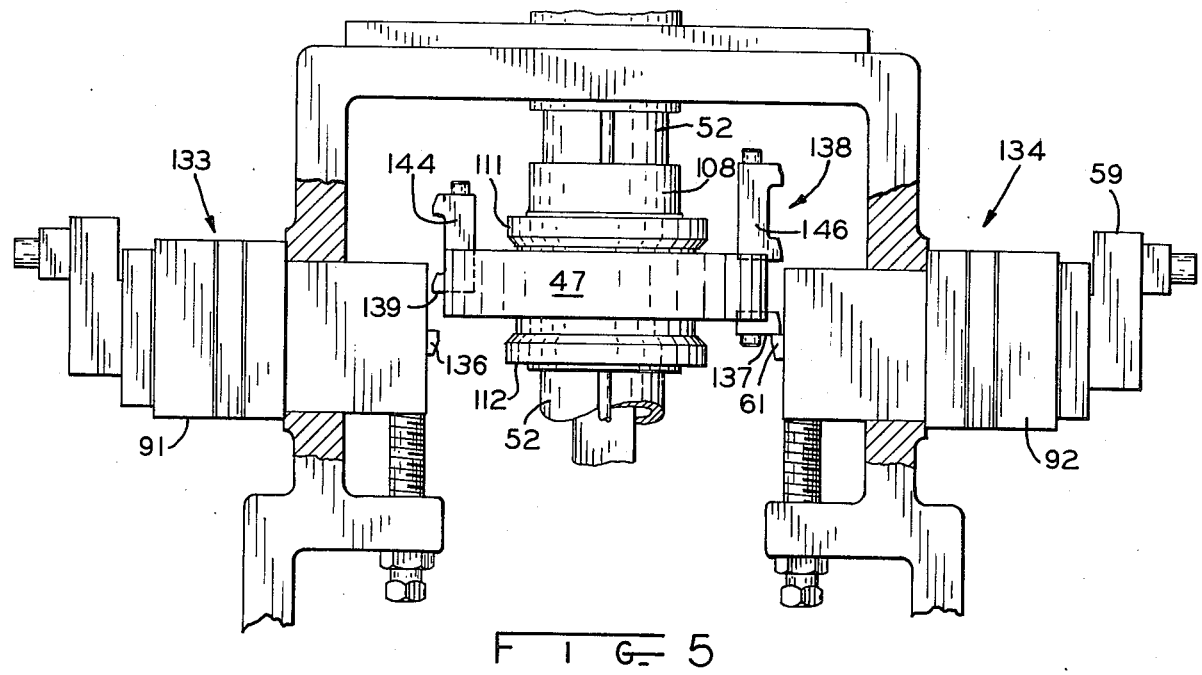
FIG. 5 is a veiw, with parts broken away, and parts in section, of the winding head of FIG. 4.
Figure 7:
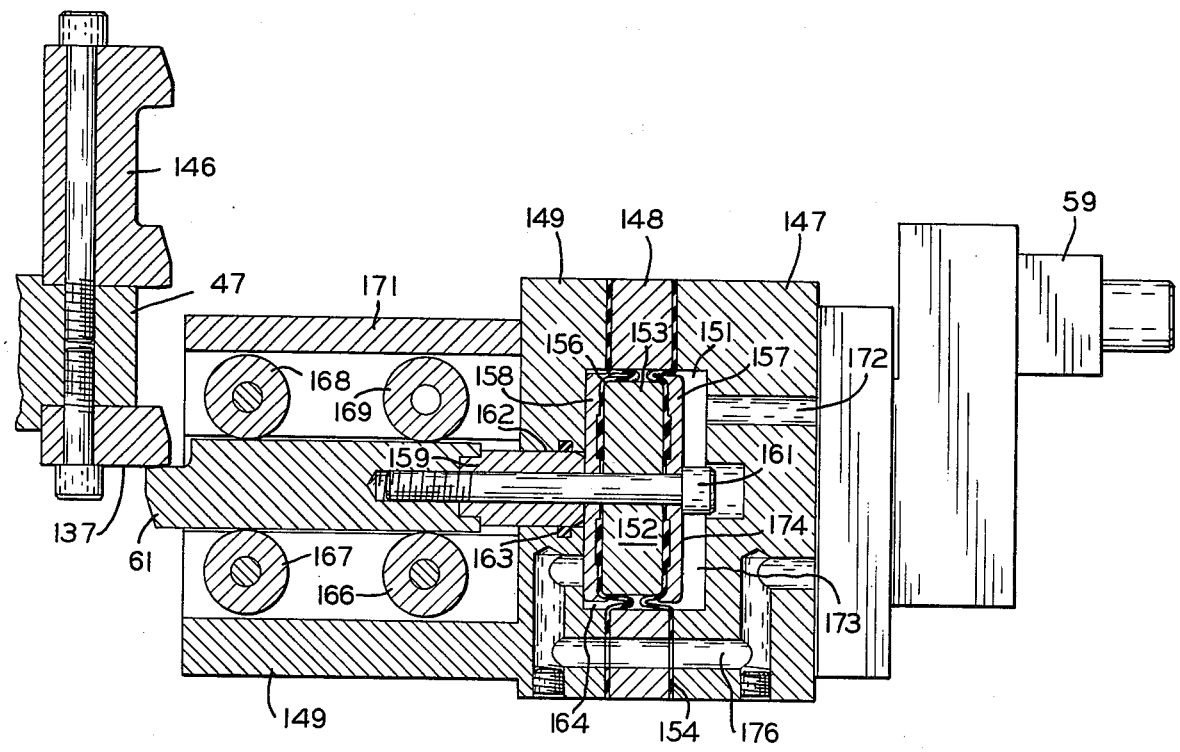
FIG. 7 is an enlarged side elevation, with parts in section and parts removed, of a portion of the structure shown in FIG. 5.

Referring now to FIGS. 5 and 7, each winding head includes two air operated, diaphragm-piston driven, latch stop assemblies 133 and 134 which include the above mentioned cylinders 91, 92. These assemblies are substantially identical and therefore only assembly 134 is described in detail herein. At the outset, it is noted that assembly 134 includes the previously mentioned air valve 59 which was a 6 volt, d.c. air valve, catalog No. 91913 from Numatics, Inc. of Highland Michigan. The assemblies 133, 134 each include a latch bar 61, 136, and these bars normally are in a latching position, as shown in FIG. 5.

At the beginning of a machine cycle, latch bar 61 of latch stop assembly 134 is in contact with a catch plate surface 137 which forms part of the jump plate assembly 138. Thus, the latch bar 61 retains the assembly 138 in an elevated position. Latch stop assembly 133 then is poised to stop jump plate assembly 138 at the end of a first jump stroke.

When a jump command is first given by control 56 (see FIG. 3), latch stop assembly 134 is momentarily actuated by air valve 59 so that latch bar 61 is momentarily retracted, to thereby allow axial movement of jump plate assembly 138 in a downward direction, until catch plate 139 stops against latch bar 136 of the latch stop assembly 133. Just after catch plate surface 137 has passed latch bar 61, latch stop assembly 134 is returned to its normal condition so that stop catch plate surface 141 will be stopped by latch bar 61 during the next jump sequence. It will be understood that during each next jump sequence, the output of control 56 of FIG. 3 is applied to the air valve for latch stop assembly 133. In subsequent jump cycles, catch plate surfaces 142, 143 are utilized as will be understood. The catch plate surfaces are carried by stop blocks 144, 146 which in turn are bolted to jump plate 47. It should be noted that these blocks are hidden from view in FIG. 4. Since latch stop assemblies 133 and 134 are the same, the relationships of various parts of only latch stop assembly 134 will now be described, reference being made, and attention being directed, to FIG. 7.

Latch stop assembly 134 is air energized by the high speed Numatics air valve 59 mentioned above. A housing for air cylinder 92 is made up of a cap block 147, housing block 148, and latch guide block 149. These blocks are bolted together to form an air tight cylindrical cavity 151 in which a diaphragm enclosed piston assembly 152 operates. Diaphragm enclosed piston assembly 152 is constructed of a central piston 153 enclosed on each side by diaphragm members 154 and 156. Diaphragm member 154 is sealed to piston 153 by a retainer 157, and diaphragm member 156 is sealed to piston 153 by a retainer 158.

The diaphragm enclosed piston assembly 152 is held rigidly together and attached to latch bar 61 by means of a piston rod 159 and bolt 161. Piston rod 159 extends through an opening 162 in latch guide block 117, and is provided with a seal 163 to prevent air escape from cavity 164. Latch bar 61 is constrained to travel in a horizontal path by rollers 166, 167, 168, and 169, as will be apparent from FIG. 7. The rollers 166, 167 are supported by latch guide block 149, and rollers 168, 169 are supported by roller block 171 which is attached to latch guide block 149. Diaphragm member 154 extends between, and acts as an air seal gasket between cap block 147 and housing block 148; while diaphragm member 156 extends between, and acts as an air seal gasket between housing block 148 and latch guide block 149. The diaphragm parts 154 and 156 may be purchased from the Bellofram Corp. of Bridgeport, Conn., and are identified by such company as "rolling diaphragms" catalog No. 4C-200-15-CPJ.

Latch bar 61 is held in its normally closed position due to the pressure of air supplied by air valve 59 which air is directed through air passage 172 into air cavity 173, and acts on face 174 of diaphragm enclosed piston assembly 152, thereby to force it to the left as viewed in FIG. 7. When valve 57 is actuated so as to initiate a jump sequence, it vents passage 172 to atmosphere, and directs high pressure air (e.g., air at a pressure of about 90 psia) into air passage 176 and thence into air cavity 164 so as to force the diaphragm enclosed piston assembly 152 to the right (as viewed in FIG. 7) so as to retract latch bar 61.

Latch bar 61 is retracted only momentarily, and immediately is interposed to its normal position. However, the latch bar 61 and catch plates are so contoured that the catch plates, once they have begun moving, will continue to move past the latch bars.

Figure 8:
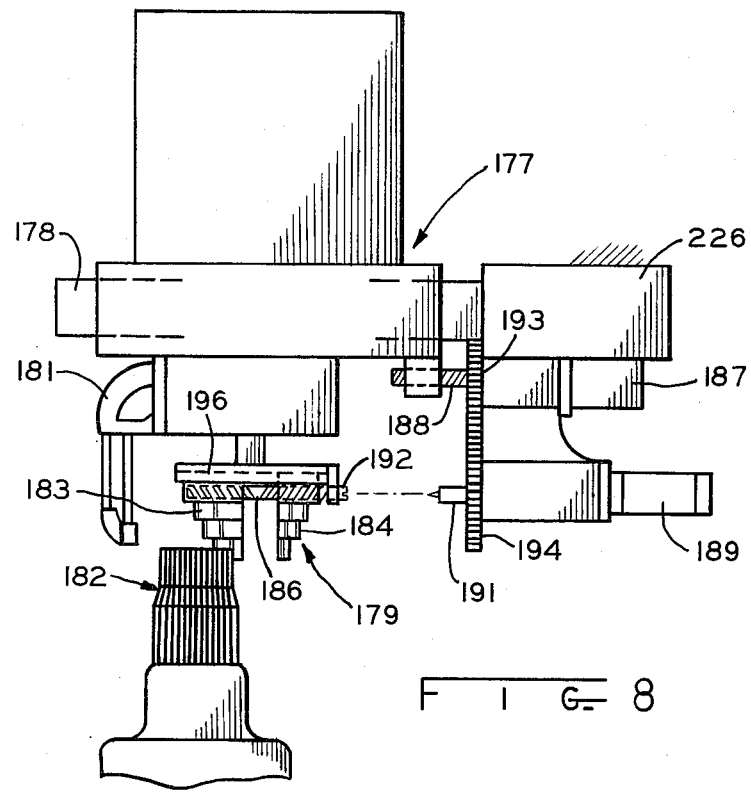
FIG. 8 is a schematic view of parts of apparatus that embodies, and which may be used to carry out, our invention in another form thereof.

With reference now to FIG. 8, still other aspects of the present invention will be described. The apparatus that is schematically illustrated in FIG. 8 is useful for understanding one preferred mode of carrying out methods that embody another form of our invention. It will be recalled, from the introductory portion of this application, that it is desirable to maintain, to the extent practical, a geometrically centered relationship between a coil form assembly and wire dispensing means that are relatively rotatable during generation of winding turns. This is particularly the case, and yet particularly difficult to accomplish, when a winding form part must also be maintained in alignment with a coil receiving mechanism. This problem is particularly vexacious, as will be readily appreciated, when the winding receiving mechanism is received in telescoping or interdigitated relationship with a portion of the form means, as is the case of shedder winders. However, the same problem is present with those types of equipment wherein complete coil groups (or poles) are developed about a coil form assembly and then automatically transferred into a coil receiver.

Winding equipment has been provided in the past where coil form parts have been moved relative to one another and in opposite directions so as to maintain a concentric relationship between the winding forms and wire dispensing means, movement of the forms being affected in order to develop winding turns that will be accommodated in cores of different stack heights. However, in all of the equipment familiar to us wherein this has been acomplished, it has been necessary to use a manual coil transfer tool for the purpose of removing the wound coils from the winding form. To our knowledge, it has not been possible to maintain the desired concentric relationship in apparatus where winding turns are automatically transferred directly into coil injection tooling or a machine mounted transfer tool (which is then used to transfer the wound coils to coil injection equipment).

Figure 9:
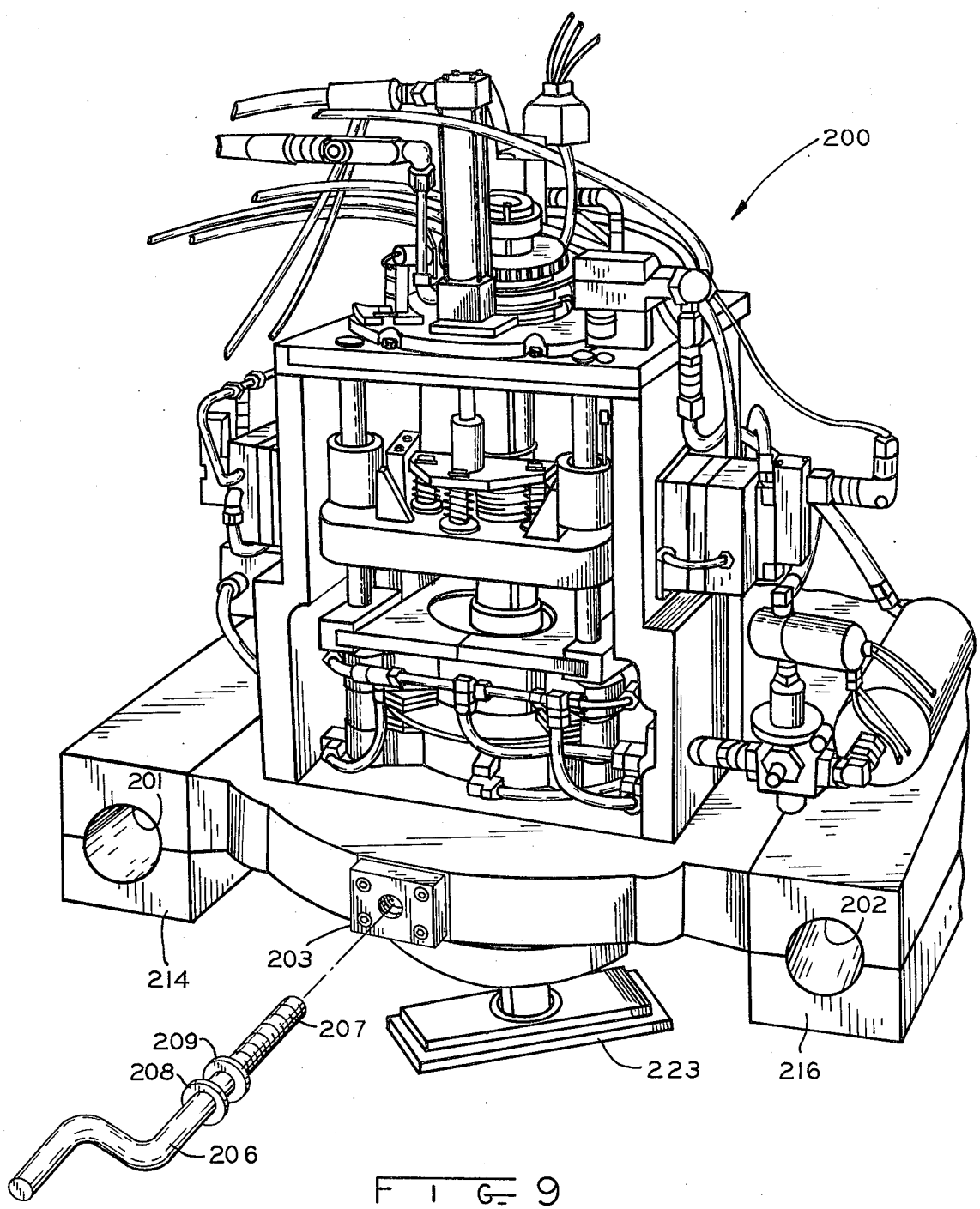
FIG. 9 is a perspective view of a winding head substantially identical to the winding head shown in FIG. 4, but including modifications to permit it to be used as part of the apparatus of FIG. 8.
Figure 10:
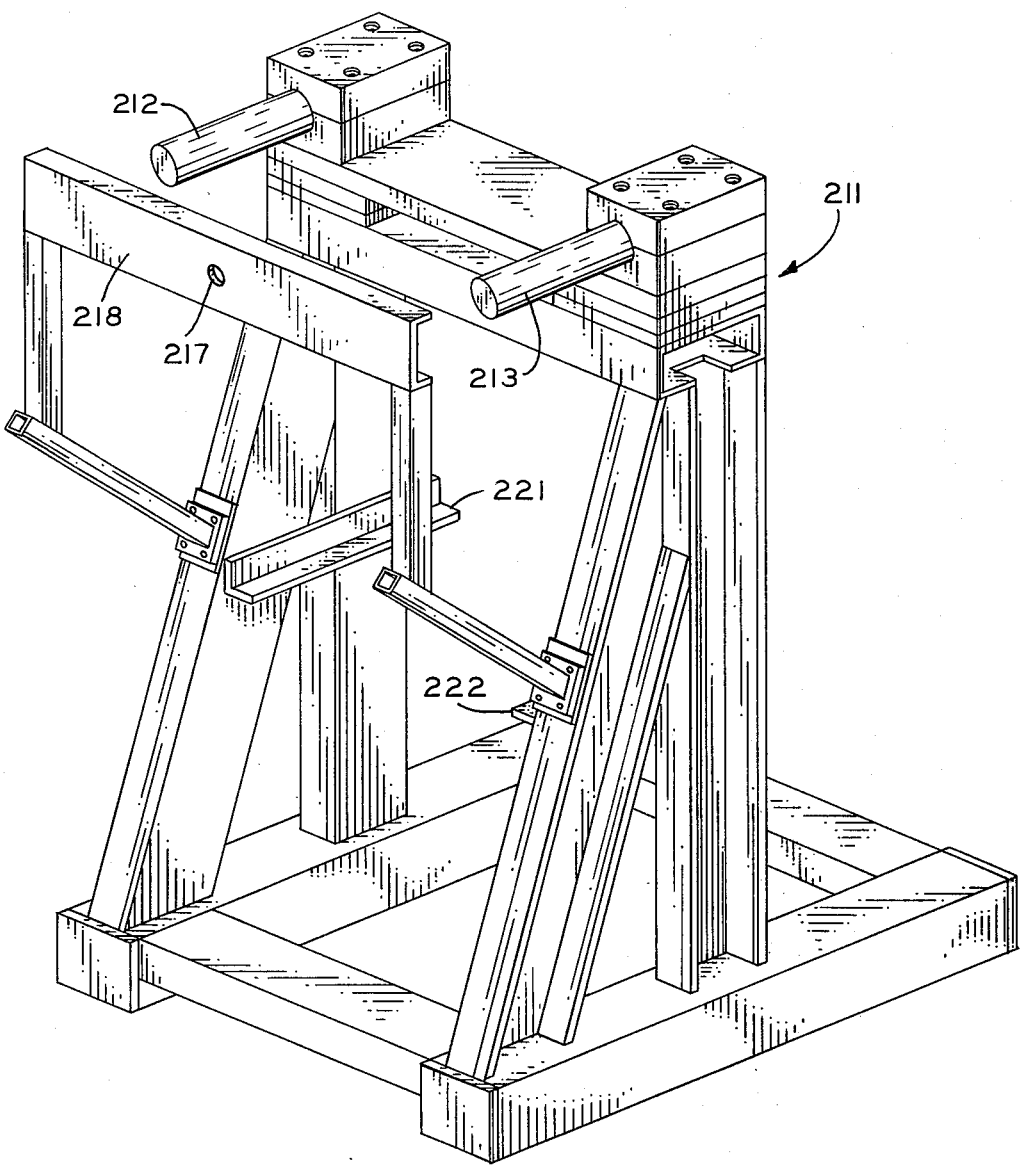
FIG. 10 is a perspective view of a machine frame for accommodating the winding head of FIG. 9.

The purpose of the structure shown in FIGS. 8 through 10 is to provide a means of centering winding tools (e.g., a form assembly) with respect to a wire dispensing means that has been illustrated as a flyer, and to further provide means for maintaining a desired predetermined aligned relationship between the winding tools and a winding turn receiver. This procedure permits wire demand, i.e., the tension forces applied to wire that is dispensed from a supply, to be relatively constant for all stack sizes which are wound about a coil form assembly; and this is particularly important for high speed windings.

With particular reference now to FIG. 8, a winding head 177 has been illustrated as being mounted on a pair of guide rods (only one guide rod being visible in FIG. 8). The winding head 177 is substantially identical to the winding head 22 which has been described hereinabove. The apparatus which is schematically illustrated in FIG. 8 is susceptible of automatic operation for effecting a change in the span of the parts that make up the coil form assembly 179; and at the same time maintain a geometrically centered relationship between the coil form assembly and a flyer 181, as well as maintain a desired predetermined relationship between interfitting parts of the coil form assembly 179 and coil turn receiving mechanism 182. The structure of FIG. 8 includes means for adjusting parts of the coil form assembly in opposite directions so that equal amounts of travel are obtained in opposite directions of at least the two coil form parts 183, 184. Also provided are means for relatively adjusting the position of the winding turn developing mechanism and winding turn receiving mechanism.

A screw 186, provided with right-hand threads at one end thereof and left-hand threads at the other end thereof, is threaded into threaded portions of the coil form portions 183, 184. Thus, as screw 186 is turned in one direction, the coils form portions 183 and 184 will move toward one another, but rotation of the screw 186 in the opposite direction will cause the coil forms 183 and 184 to move away from one another. Also provided is a motor 187 which drives a screw 188. The screw 188 includes threads having the same lead as the threads on screw 186. Motor 187 is reversible, and thus can drive winding head 177 to travel in opposite directions along support 178. Motor 187 is interlocked with an air cylinder 189 through suitable controls so that motor 187 can be energized only so long as a spline shaft 191 is in an extended position and in engagement with the head 192 of screw 186. While the spline shaft 191 is so engaged, motor 187 is energized and screw 188 is turned a desired amount in either a clockwise or counterclockwise direction.

Screw 188 is welded or otherwise fixed to a gear 193 that meshes with gear 194. The gear 194, in turn, is provided with an internal spline so that spline shaft 191 is constrained to rotate with the gear 194. With the lead of screw 188 identical to the lead of screw 186, the gears 193 and 194 are selected to have the same number of teeth so that a one to one ratio will exist between screws 188 and 186. Moreover, if the thread of screw 188 is a right-hand thread, the portion of screw 186 which engages the front winding form 183 will be provided with a left-hand thread for the gearing arrangement shown. Then, as winding head 177 is moved a desired distance to the left as viewed in FIG. 7, the front coil form 183 will be moved a corresponding and equal distance in the opposite direction (i.e., to the right as viewed in FIG. 8), and the coil form 183 will remain stationary relative to the machine frame. Thus, a desired aligned relation between the coil form portion 183 and winding turn receiving mechanism 182 will be maintained. However, during the time that the coil form portion 183 is undergoing movement relative to the coil form support plate 196, the coil form portion 184 also will be moved a corresponding incremental distance. Accordingly, the coil form portions 183 and 184 will have been adjusted so as to provide winding turns of sizes to correspond to a different core stack height, the coil form assembly will remain centered relative to the winding head, and will also remain in alignment with the coil turn receiving mechanism.

After the apparatus shown in FIG. 8 has been adjusted as described, the spline shaft 191 is retracted so that it will be outside the path of the rotating flyer 181. The apparatus of FIG. 8 then is in condition for use in producing windings having coils that may be injected into stator cores.

In FIG. 9, a winding head 200 is illustrated which is substantially identical to the winding head 22 described hereinabove. Accordingly, only those parts of winding head 200 which are additional to the parts shown in FIG. 4 will be discussed in detail. Initially, it will be noted that the winding head 200 is designed (like winding head 22) so that it may be mounted on a pair of horizontal support bars. Thus, head 200 is provided with two horizontally extending ways 201, 202 which may slide on such bars. Head 200 also includes an opening over which a threaded cap plate 203 is disposed. The cap plate 203 will threadingly receive a hand crank 206, and thus the threaded end 207 of crank 206 may move telescopically along the previously mentioned opening in head 200.

The hand crank is also provided with a pair of removable stops or collars 208, 209, which may be fixed to the crank with set screws. The reason for modifying head 200, and providing crank 206, will be more apparent when the machine frame 211 of FIG. 10 is considered. It will be noted that frame 211 includes a pair of horizontal supports 212, 213 which may be used to support the head 200 along its ways. For example, the bottom caps 214, 216 may be removed from head 200 by removing not shown bolts that normally fasten such caps to the frame of head 200. The head 200 may then be positioned on the frame 211, with the supports 212, 213 engaging the ways 201 and 202. Thereafter, the caps 214, 216 may be reassembled with the head 200.

After the head 200 has thus been assembled with frame 211, it is slidable along the supports 212 and 213, but held in preselected fixed positions by means of the crank 206 which is shown in FIG. 9. More specifically, collar 209 is removed from the crank, and the crank is then positioned in an opening 217 that is formed in frame member 218. Thereupon, the collar 209 is slipped over the end of the crank, and crank end 207 is then threaded into cap plate 203 so that collar 208 abuts against the frame member 218. Subsequently, collar 209 is held snugly against the back of frame member 218 while it is tightened to the crank.

Conventional winding turn receiving tooling may thereafter be supported on frame members 221, 222. Such tooling may be of the transfer magazine type, or of the coil injection type, in which case it may be substantially the same as the tooling shown in FIG. 1. It will be understood that an adjustable form assembly, such as the assembly 179 of FIG. 8, will be attached to the coil form support plate 223 so that at least the front and rear form portions may be slid therealong. Moreover, a screw similar to screw 186 (see FIG. 8) will be provided, and such screw will, of course, be fixed to the plate 223 so that it may rotate but be restrained from moving axially relative to the plate.

Adjustment of the coil form assembly on winding head 200 (while the head is on frame 211 of FIG. 10) may then be accomplished by manually turning the form adjusting screw (e.g., screw 186 in FIG. 8). However, the front and rear form sections will remain centered relative to the flyer arm on the head 200. The hand crank 206 may then be turned in order to move the entire head 200 along the guides 212, 213 and thus insure that the form assembly is properly aligned with the winding turn mechanism positioned therebeneath.

It is to be understood that the foregoing description has been provided for purposes of description only, and that modifications in the exemplified structure may be made.

For example, the apparatus of FIG. 8 may be modified so that the winding head 177 is held stationary relative to machine frame 226; and so that the winding turn receiving mechanism is shifted relative to the machine frame 226 in order to maintain its relative alignment with the coil form assembly 179 when the form assembly is adjusted to produce windings for cores of different stack heights. In addition, the features just discussed may be applied to winding equipment of the type where complete coils are developed on a coil form (whether by the rotating flyer or rotating arbor method), and then automatically transferred to a winding turn receiving mechanism which forms part of the apparatus and which must be maintained (or moved into) an aligned relationship with the coil form.

Although our invention has been described with extensive reference to particular embodiments illustrated herein, it will be understood that the invention may be used to good benefit with different types of winding equipment. Therefore, while we have shown and described what are presently believed to be preferred embodiments of the invention; and preferred modes of practicing the invention; changes may be made without actually departing from the true spirit and scope of the invention. Accordingly, we intend to cover in the following claims all such equivalent variations as fall within the invention.

What we desire to secure by Letters Patent of the United States is:

1. A method for use in developing at least two differently sized wound coils by relatively rotating wire dispensing means and at least one coil form part to generate turns of a first coil about the at least one coil form part, moving at least some of the turns of the first coil along gaps established by a coil turn receiver, relatively moving the coil receiver and at least one coil form part along a longitudinal axis, and generating at least some of the turns of a second coil about the at least one coil form part; the method comprising: applying a force from a prime mover to an energy storage device, and monitoring the relative rotational position of the wire dispensing means and at least one coil form part and generating signals indicative of the relative rotational position of the wire dispensing means and at least one coil form part; and initiating relative axial movement between the at least one coil form part and the coil receiver during a preselected portion of a preselected relative revolution of the at least one coil form part and wire dispensing means by applying a force from the prime mover and a force from the energy storage device to at least one of the relatively movable parts.

2. The method of claim 1 wherein the at least one coil form part moves relative to the coil receiver, and the energy storage device includes a plurality of springs trapped between a plate movable in response to the prime mover and a plate interconnected with and movable with the at least one coil form.

3. A method of adjusting winding equipment so that coils of different predetermined coil sizes may be developed therewith for subsequent axial insertion into stator cores of a predetermined height corresponding to the predetermined coil sizes, wherein the winding equipment includes at least first and second coil form parts and wire dispensing means that are supported for relative rotation about a first axis, and a winding turn receiver adapted to interfit with at least one of the coil form parts, the method comprising: moving at least the first and second coil form parts in substantially opposite directions and each substantially the same amount with reference to the first axis; and relatively moving the coil turn receiver, wire dispensing means, and at least one of the coil form parts so that a predetermined alignment is maintained between the coil turn receiver and at least the one coil form part that interfits therewith.

4. The method of claim 3 wherein moving the at least two coil form parts in substantially opposite directions conditions the machine to provide coils of different sizes without introducing objectionable eccentric geometric relationships between the relatively rotatable parts of the winding machine.

5. The method of claim 3 wherein the wire dispensing means is a flyer rotatable about the first axis.

6. The method of claim 3 wherein moving at least the first and second coil form parts includes rotating a screw, operatively connected with the movable coil form parts, at two spaced apart portions thereof, having threads of equal but oppositely directed leads along the two spaced apart portions thereof.

7. Winding apparatus including at least one coil form, at least one wire dispenser mounted relative to the at least one coil form to permit relative rotation therebetween; a coil turn receiver; means for monitoring the relative rotational position of the at least one coil form and wire dispenser; means for generating a plurality of position signals during each revolution of relative rotation, indicative of the relative rotational position of the wire dispenser and at least one coil form; control means responsive to the position signals for providing a jump signal; and jump means for causing relative axial movement of the coil receiver and the at least one coil form relative to one another in response to a jump signal from the control means, said jump means including a prime mover, jump plate, and energy storage means interconnecting the prime mover and jump plate; the jump plate being movable under the influence of forces released from the energy storage means as well as forces applied to the energy storage means by the prime mover during movement of the jump plate.

8. In winding apparatus of the type wherein relative axial movement between a coil receiver and at least one coil form part is required, the improvement comprising: means interconnected with one of the axially movable parts for causing axial movement of said one of the axially moving parts; an energy storage device interconnected with said one of the axially movable parts; a prime mover interconnected with said one of the axially movable parts through the energy storage device, and first and second retainer means for restraining axial movement of said one of the axially movable parts; movement of the first retainer means permitting movement of said one of the axially movable parts in response to forces applied thereto from the energy storage device as well as the prime mover; said energy storage device being operative, when axial movement of said one of the axially movable parts is arrested by a second retainer means, to absorb energy applied thereto by the prime mover.

9. The apparatus of claim 8 wherein the means interconnected with one of the axially movable parts includes a jump plate; the axially movable part is at least one part of a coil form; and the energy storage device is a lost motion mechanism.

10. The apparatus of claim 9 wherein the lost motion mechanism includes a retainer and at least two coil springs; said springs being trapped between the jump plate and retainer, and said prime mover being interconnected with the retainer.

11. The apparatus of claim 10 wherein the prime mover is a fluid cylinder.

12. An improved winding machine comprising a machine frame; at least first and second coil form parts; at least one wire dispenser; at least one winding turn receiver movable to an interfitting relationship with at least the first coil form part for receiving winding turns therefrom; means for causing relative rotation, about a predetermined axis, of the at least one coil form part and wire dispenser; means for moving the at least first and second coil form parts substantially equal and opposite distances relative to the predetermined axis so as to maintain a predetermined concentric geometric relationship of at least the first and second coil form parts relative to the predetermined axis; said apparatus further comprising means for controlling the position of the winding turn receiver relative to at least the first coil form part so as to maintain a predetermined desired aligned relationship between the winding turn receiver means and at least the first coil form part.

13. The structure of claim 12 wherein the means for adjusting at least the first and second coil form parts comprises a threaded member having threads at spaced apart portions thereof for moving the coil form parts relative to one another.

14. The structure of claim 13 wherein the wire dispenser and coil form parts are part of a winding head, supported on a machine frame; and the means for controlling the position of the winding turn receiver relative to at least the first coil form part comprises a device supported on the frame and threaded into the winding head; rotational movement of the threaded device causing the winding head to move relative to the machine frame and the coil receiver.

15. The structure of claim 12 wherein the apparatus further includes a jump mechanism for moving the coil form parts axially relative to the coil receiver; said jump mechanism including a jump plate and a plurality of latch mechanisms for retaining the jump plate in a desired position; at least one latch mechanism comprising a latch pin interconnected with a diaphragm enclosed air piston.

16. A method of setting up, to produce coils of different predetermined sizes, winding equipment having a plurality of components comprising at least one winding turn receiver, at least one wire dispensing means, and at least first and second coil form parts that are supported by coil form support means and that are relatively rotatable with respect to the at least one wire dispensing means about an axis of rotation and that are relatively movable with respect to one another; and wherein a predetermined alignment between at least one coil form part and the winding turn receiver is maintained, and a predetermined geometric concentric relationship is maintained between the first and second coil form parts and wire dispensing means while the first and second coil form parts are moved relative to one another; the method comprising: relatively moving the winding turn receiver and at least the coil form support so that the predetermined alignment is maintained between the winding turn receiver and the first coil form part when the plurality of components are in different set up positions; the plurality of components being relatively moved to different set up positions as a result of relative movement of the at least first and second coil form parts, relative movement of at least one of the coil form parts with respect to the wire dispensing means, and relative movement of the winding turn receiver and coil form support.

17. A method of setting up coil winding equipment to produce winding turns for coils of different sizes corresponding to different magnetic core stack heights, wherein the winding equipment includes a plurality of relatively movable components comprising at least one winding turn receiver, wire dispensing means, and a coil form assembly including at least first and second parts, and wherein a predetermined alignment is to be maintained between at least the first coil form assembly part and the at least one winding turn receiver after at least the first and second coil form assembly parts have been moved relative to one another and after at least one of the coil form assembly parts and the wire dispensing means have been moved relative to one another to maintain a predetermined geometric concentric relationship between the first and second coil form assembly parts and the wire dispensing means, the method comprising: relatively moving at least some of the components to relative set-up positions to provide for desired operation of the winding equipment and maintaining the predetermined alignment between the turn receiver and first coil form assembly part.

\* \* \* \* \*